Oct. 9, 1956 W. H. WRIGHT ET AL 2,765,934
CHARGING CAR AND OPEN HEARTH PLANT, INCLUDING SAME
Filed Aug. 1, 1951 7 Sheets-Sheet 1
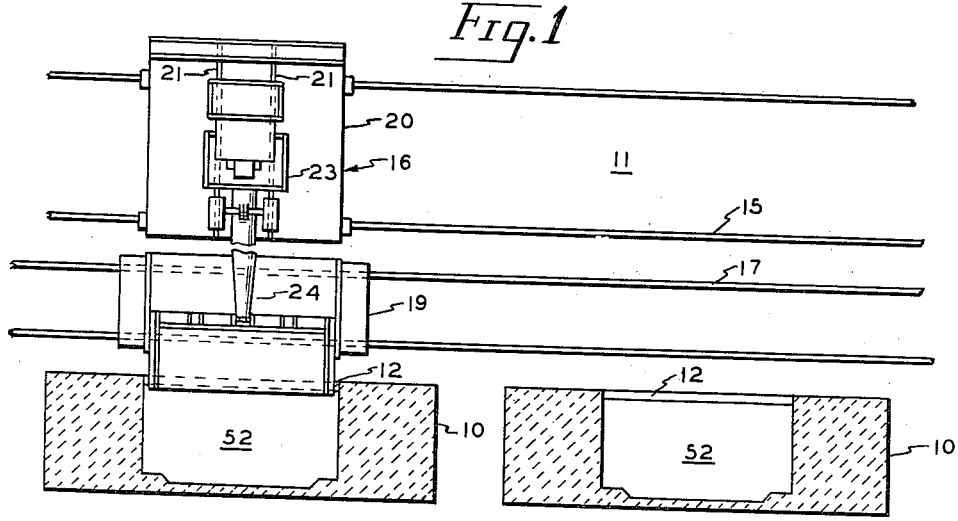
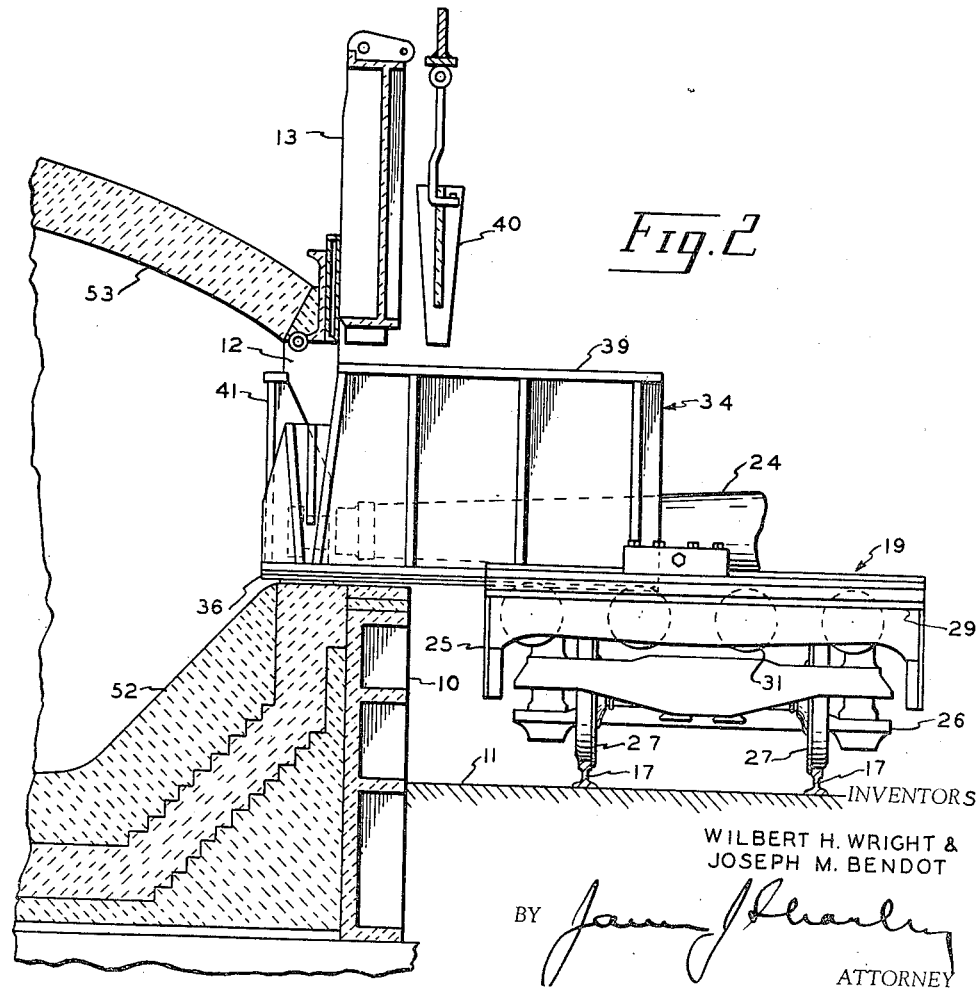
INVENTORS
WILBERT H. WRIGHT &
JOSEPH M. BENDOT
BY
ATTORNEY

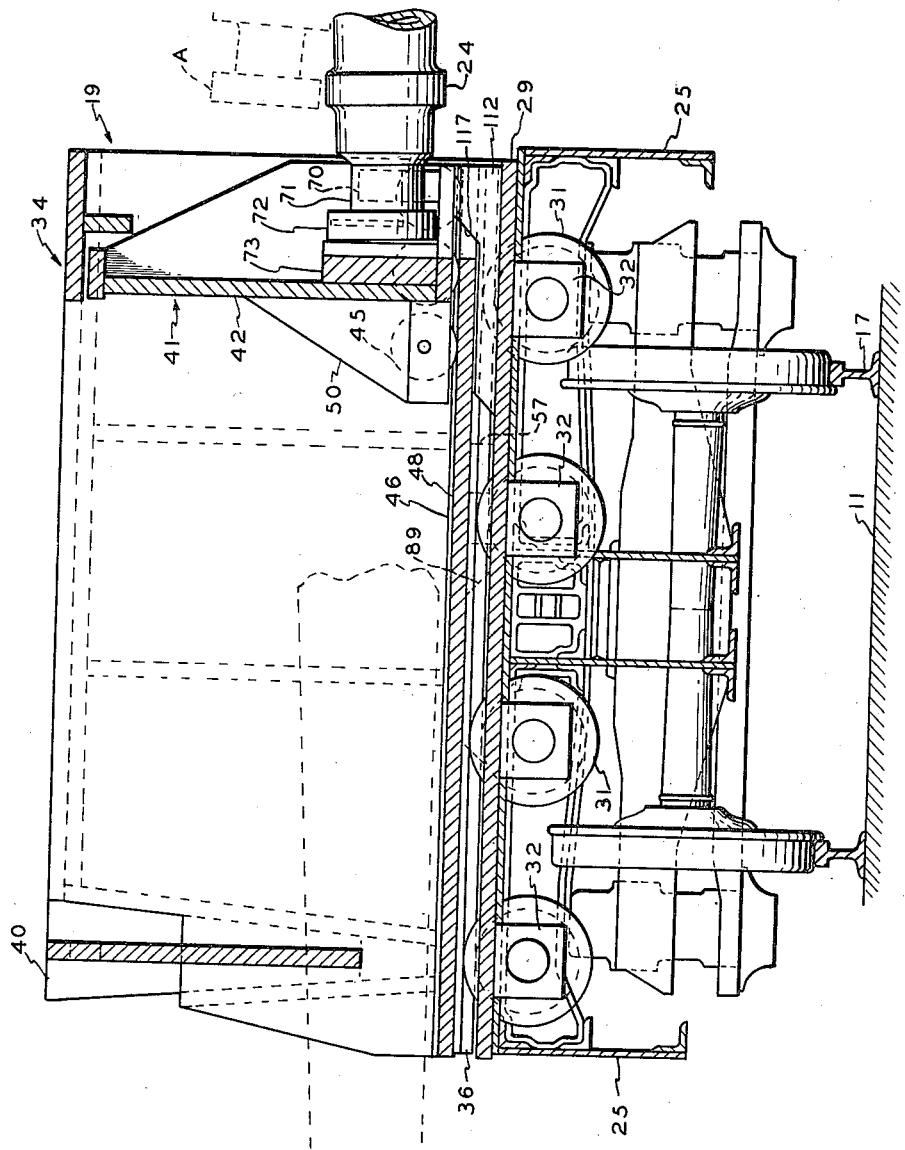

INVENTORS
WILBERT H. WRIGHT &
JOSEPH M. BENDOT

BY *James J Shanley*

ATTORNEY

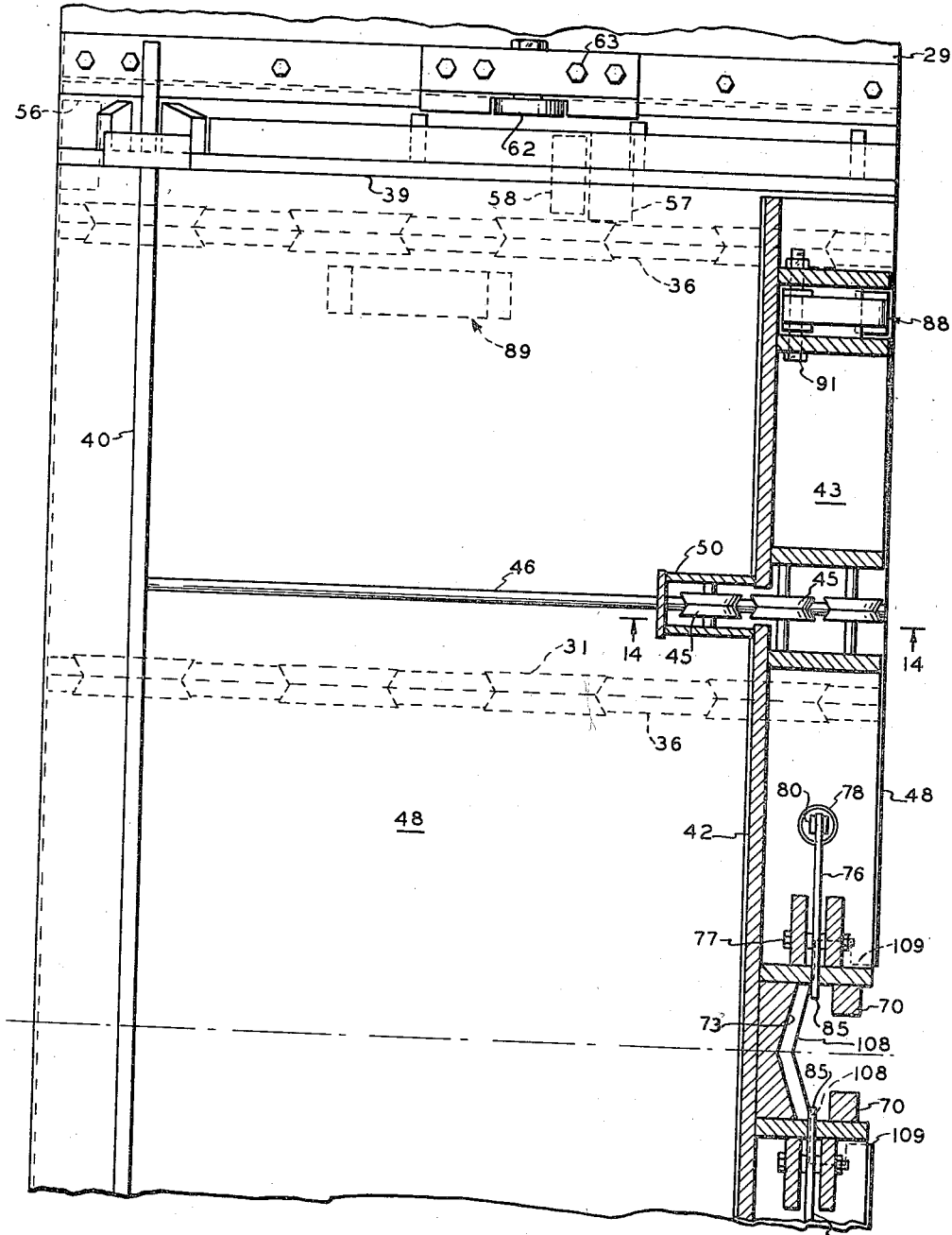

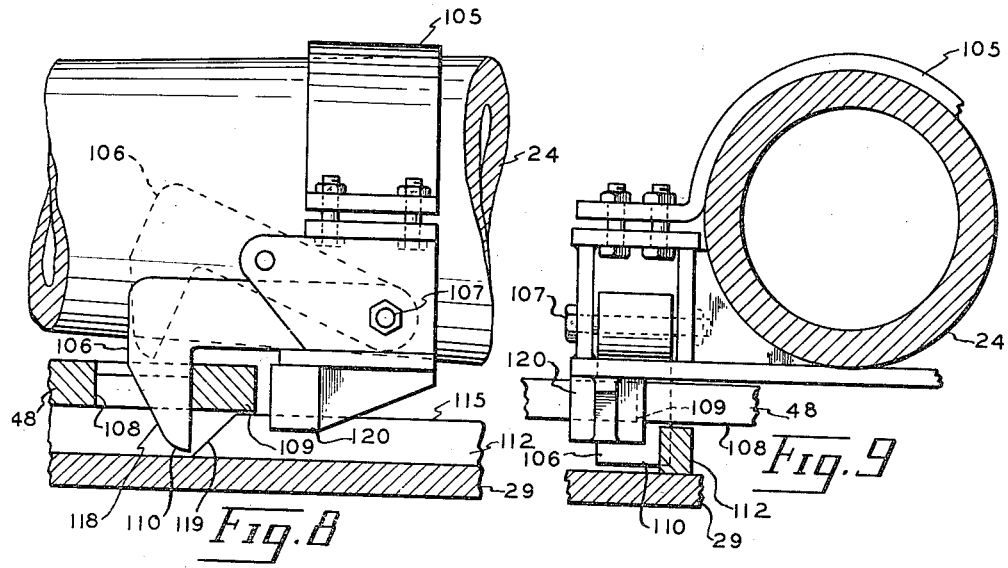
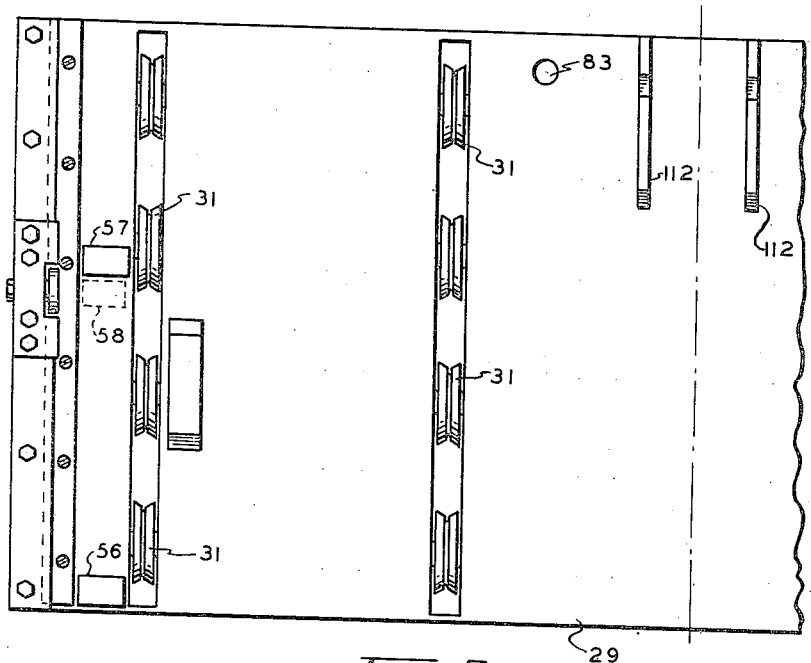

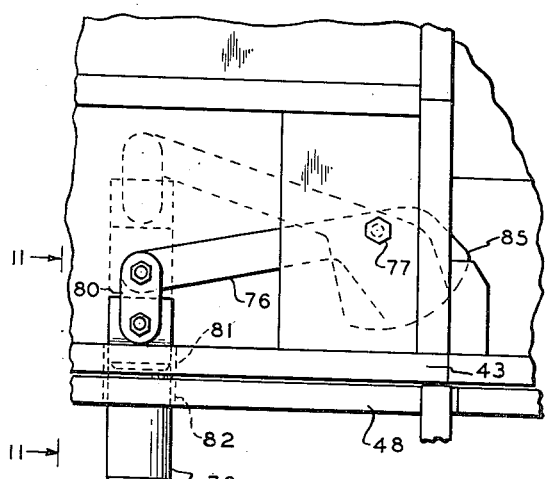
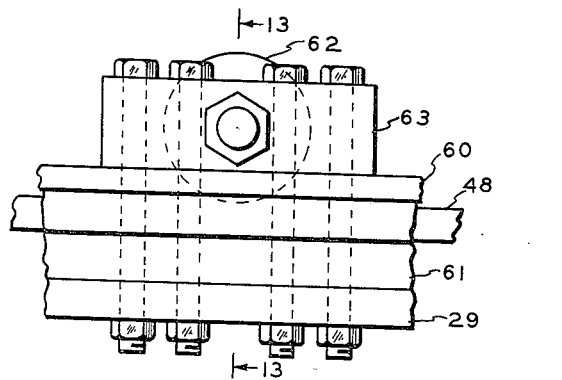
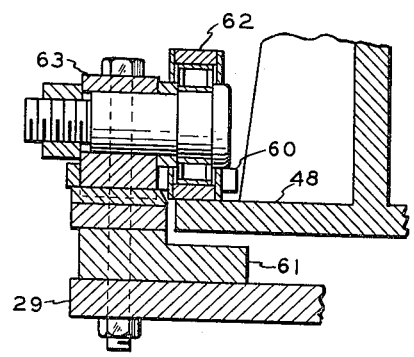
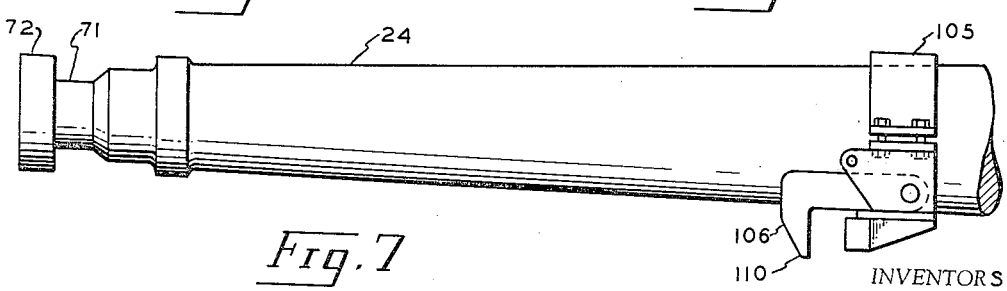
INVENTORS
WILBERT H. WRIGHT &
JOSEPH M. BENDOT

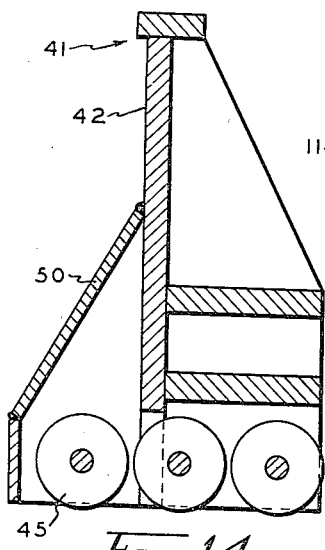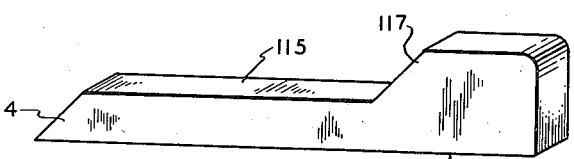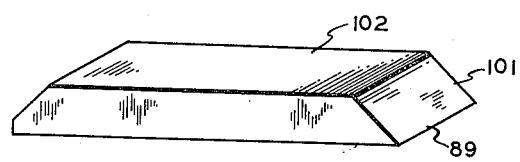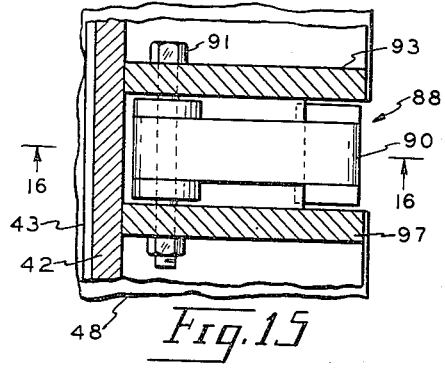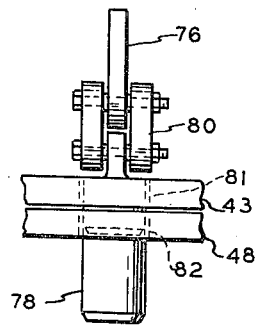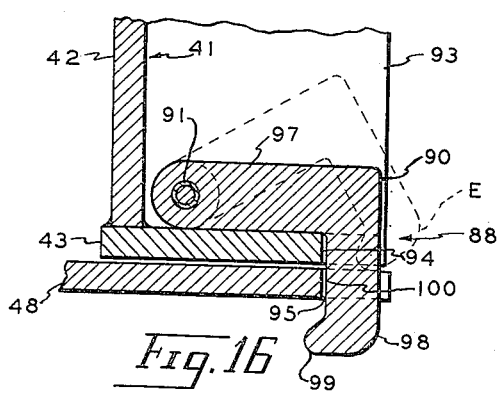

United States Patent Office 2,765,934
Patented Oct. 9, 1956

2,765,934

CHARGING CAR AND OPEN HEARTH PLANT, INCLUDING SAME

Wilbert H. Wright, Weirton, W. Va., and Joseph M. Bendot, Steubenville, Ohio, assignors to National Steel Corporation, a corporation of Delaware Application August 1, 1951, Serial No. 239,804

13 Claims. (Cl. 214—29)

The present invention relates to an improved charging car for charging material into an open-hearth furnace, and to an improved open hearth plant including the improved charging car and an improved charging machine for operating the charging car.

Attention is called to the copending applications assigned to the assignee of the present application. The copending applications are Serial No. 239,737 filed August 1, 1951, by C. J. Klein, entitled "Charging Open-Hearth Furnaces," and application Serial No. 239,783, filed August 1, 1951, by C. E. Carr, entitled "Open-Hearth Furnace Charging."

In open-hearth plants, and particularly in the open hearth plants or installations of large steel mills, a long series of open-hearth furnaces are arranged end to end in a line extending down the middle of the open-hearth building. Each open hearth furnace has on one side a number of relatively small charging doors through which raw materials are charged into the hearth of the open-hearth furnace. The floor extending along the front or charging side of the furnaces is called the charging floor and the pouring floor extends along the opposite sides of the furnace so that the raw materials are charged into the furnace from the charging floor and the finished steel is tapped from the furnace into ladles located on the pouring floor on the opposite side of the furnace. On the charging floor, there is a wide gauge track spaced from but extending parallel to the row of open-hearth furnaces. On this wide gauge track there is mounted one and usually a number of charging machines. Each charging machine includes a lower carriage or truck having wheels mounted on the track and movable therealong. A second carriage is mounted on and movable back and forth along rails extending across the lower main truck and this upper charging carriage carries a peel which is tiltable upwardly and downwardly and also is rotatable. Between the wide gauge track and the open-hearth furnaces, there is a relatively narrow gauge track which extends along the row of furnaces and connects with other rails extending out into the stock yard of the plant. Charging cars or buggies, each supporting a number of charging boxes, are loaded in the yard and then moved along the rails into position adjacent the open-hearth furnace which is to be charged. Each buggy supports a plurality of charging boxes and each charging box will hold, for example, about a ton of solid scrap steel. After the buggy and charging machine have been moved into place, the operator of the charging machine moves the peel outwardly so that the end of the peel engages a slot in the end of the charging box. The peel is locked into engagement with the end of the box and then the box is lifted and inserted through the door into the open-hearth furnace. The box is then turned 180° to dump the charge into the furnace after which the box is withdrawn and replaced on the buggy. This procedure is repeated until the open-hearth furnace has been fully charged.

The iron ore, limestone and scrap metal are charged in the manner described above with the scrap metal, which is usually scrap steel, constituting the largest item of solid raw material charged into the furnace. Many tons of scrap metal are charged into each open-hearth furnace and a long period of a number of hours is required to charge an open-hearth furnace. With the larger open-hearth furnaces which are being used today, the charging time is longer and this method of charging is similar to using a teaspoon to fill a large container.

It is an object of the present invention to provide an improved charging car for charging a large quantity of solid material into an open-hearth furnace in a short period of time.

Another object of the present invention is to provide an improved charging car including a large container that can be moved into charging position and the contents of the container pushed into the open-hearth furnace and that then can be promptly withdrawn from the furnace to prevent overheating and damaging of the container.

Another object of the present invention is to provide an improved charging car having a charge holding container slideably mounted on the car for movement transversely of the car so as to extend through the open hearth door and having a side wall for the container that is movable across the container for pushing the charge from the container into the furnace, the charging car including novel means preventing accidental or premature movement of the container relative to the car and a novel arrangement of automatically releasable means for effecting movement of the container and side wall in the proper sequence.

Another object of the present invention is to provide an improved open hearth plant including an improved charging car and an improved charging machine operating in a novel manner to charge the open hearth furnaces.

In accordance with the present invention, I provide in the open hearth plant which includes a series of aligned open hearth furnaces, a charging machine movable along rails spaced from the line of open hearth furnaces and a charging car adapted to hold a large quantity of material such as scrap metal. The charging car is movable along rails between the charging machine and the open hearth furnaces to a position in alignment with the furnace to be charged. The furnace is provided with one or more relatively wide doors to accommodate a relatively long charging box which is slideably mounted on the charging car for movement toward and through the charging door of the furnace by means of the charging machine. The container has at one side a movable side wall which can be moved across the container by means of the charging machine peel to push the charge out of the container and into the furnace. Means are provided for locking the movable wall and container in their normal position to prevent accidental movement of these portions of the car. In addition, there is preferably provided a latch means arranged so that when the peel pushes on the movable side wall the wall and container are moved together toward the open-hearth furnace and the latch is automatically released when the container is in the proper charging position so that further movement of the peel pushes the movable wall across the container and pushes the charge into the furnace. The furnace is at the high temperature and in order to prevent overheating of the portion of the container which is inside the furnace a novel arrangement is provided so that after the material has been charged into the furnace, the peel automatically engages the container to pull the container out of the furnace when the peel is first retracted. After the container has been retracted, the peel is automatically disengaged from the container so that further retraction of the peel moves the movable wall back to its original or normal position. Preferably the locking means and various latch means are all arranged so that the operator at the charging machine can, by properly positioning the peel readily operate the charging car to quickly and properly charge the material into the furnace.

These and other objects and advantages of the present invention will become more apparent when considering the following detailed description, taken with the accompanying drawings, in which:

Figure 1 is a fragmentary schematic plan view illustrating a portion of an open-hearth plant embodying the principles of the present invention;

Figure 2 is an enlarged view in elevation showing a charging car embodying the principles of the present invention in the position assumed upon charging material into the open-hearth furnace with portions of the furnace being shown in section;

Figure 3 is an enlarged transverse sectional view of the charging car of Figure 2;

Figure 5 is a plan view of the portion of the car shown in Figure 4 with the movable wall being shown in section to illustrate the construction;

Figure 6 is a plan view of the portion of the car shown in Figure 5 with the charge container removed;

Figure 7 is a fragmentary view of the peel of the charging machine of Figure 1 and illustrating a latch arrangement adapted to engage the container of the charging car;

Figure 8 is an enlarged fragmentary view of the latch mechanism shown in Figure 7 with the latch mechanism in engagement with the container;

Figure 9 is a sectional view taken along line 9—9 of Figure 8;

Figure 10 is an enlarged fragmentary view of a portion of the charging car shown in Figure 2;

Figure 11 is an enlarged fragmentary view taken along line 11—11 of Figure 10;

Figure 12 is an enlarged fragmentary view showing the hold down means also shown in Figures 2, 4, 5, and 6;

Figure 13 is a fragmentary sectional view taken along line 13—13 of Figure 12;

Figure 14 is an enlarged sectional view taken along line 14—14 of Figure 5;

Figure 15 is an enlarged fragmentary view of a latch means on the charging car of Figures 1 and 2;

Figure 4:
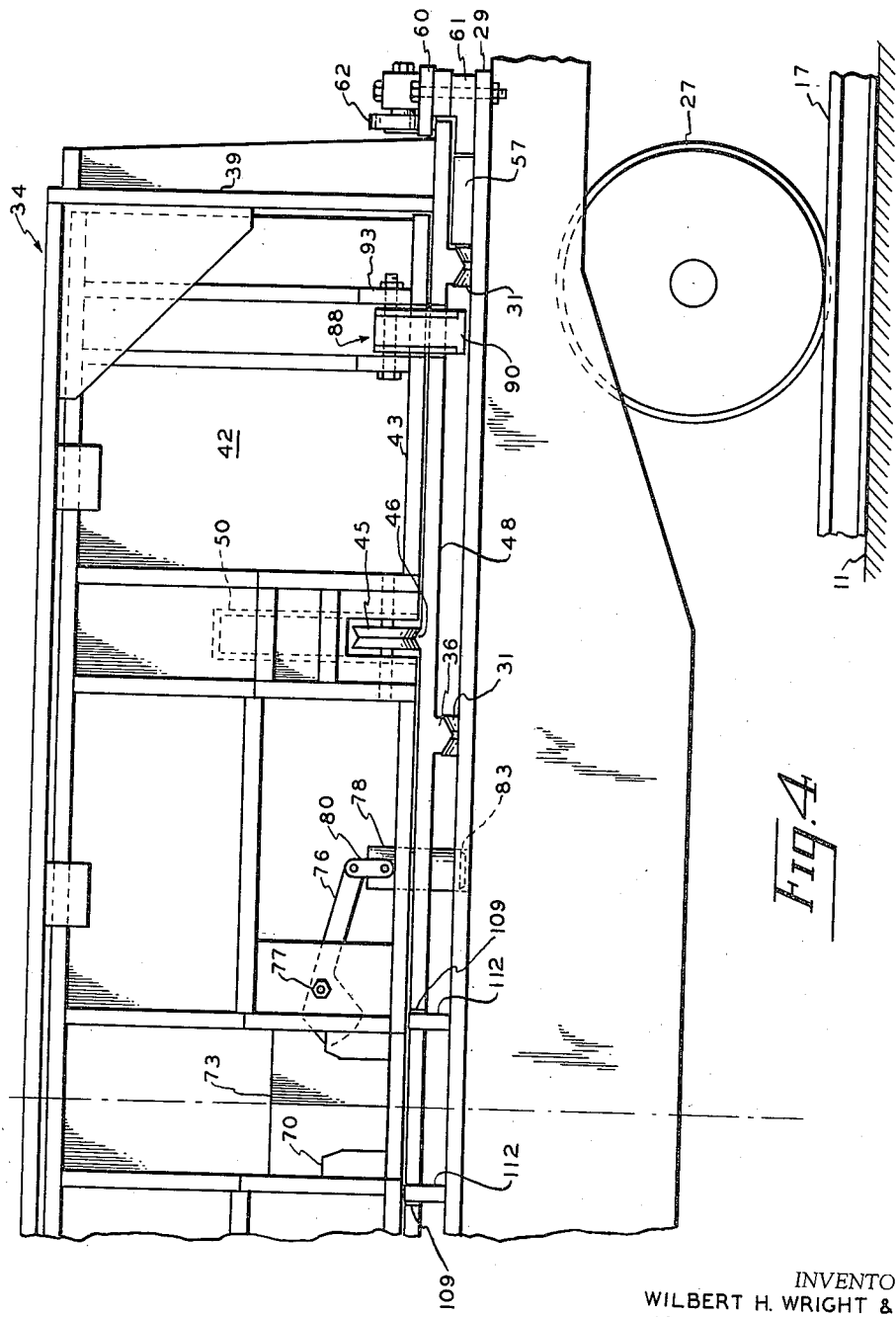
Figure 4 is a fragmentary rear elevational view of the car of Figure 3.

Figure 16 is a fragmentary sectional view taken along line 16—16 of Figure 15; and, Figures 17 and 18 are enlarged isometric views of cams mounted on the charging car and also shown in Figures 3, 5 and 6.

Referring to the drawings, Figure 1 shows the pertinent portions of an open-hearth plant including a series of open-hearth furnaces 10 arranged in end-to-end relationship and extending in a line down the middle of the open-hearth building (not shown) which may be of any suitable type. On one side of the line of open-hearth furnaces, there is located the charging floor 11. Each furnace 10 is provided on the side toward the charging floor 11 with a relatively wide doorway 12 normally closed by means of a door 13, Figure 2, which can be raised to open the doorway to permit the charging of the material into the furnace. The door may be of any suitable construction and may extend entirely across the doorway 12 or a plurality of doors may be used for closing the wide doorway 12.

As shown more clearly in Figure 1, there is on the charging floor 11 a wide gauge track 15 on which is mounted a charging machine 16. A relatively narrow gauge track 17 is disposed between the track 15 of the charging machine and the open-hearth furnaces 10. Especially in the larger mills, a number of similar charging machines are usually mounted on the track 15 and a number of charging cars 19 are provided on the narrow gauge track 17. Customarily, the narrow gauge track 17 connects with tracks extending out into the stock yard, not shown, so that the charging cars 19 can be loaded in the stock yard and then moved into the mill and onto the charging floor and then moved into alignment with the furnace to be charged. Before a furnace is charged, the charging machine 16 is moved into alignment with the furnace to be charged and then the furnace is charged with the solid material carried into the plant on the charging car. As shown, the charging machine includes a lower wheeled truck or carriage 20 mounted on track 15 for movement therealong. On this lower truck 20, there is mounted a pair of horizontal transverse rails 21 which extend in a direction normal to the direction of track 15. An upper carriage 23 is mounted on the rails 21 and supports an outwardly extending peel 24. The truck 20 is movable along rails 15 and carriage 23 is movable along rails 21, so that the peel 24 is universally movable in a horizontal plane. In addition, the peel is suspended so that it can be tilted to raise or lower the outer end of the peel. These charging machines are widely used in steel mills and are well known to those skilled in the art. The charging machine may be of any suitable type.

As shown more fully in Figures 1 to 6, the charging car 19 includes a carriage or frame 25 mounted on a pair of trucks 26 with each truck including wheels 27 that engage the rails 17 so that the car is movable along the rails. A substantially flat top 29, which may be a heavy plate, is mounted on the carriage and four sets of rolls 31 are mounted on the carriage in bearings 32. Each set of rolls includes four rolls 31 and the bearings 32 may be of any suitable type. The rolls 31 are preferably grooved as shown. A container 34 for holding the material to be charged is mounted on the car and is normally held in the normal or retracted position shown in Figures 3, 4 and 5. On the bottom of the container there are V-shaped rails 36 each rail being adapted to ride on and in a respective one of the sets of rolls 31 so that the container is laterally movable from the normal or retracted position in Figure 3 to the charging position shown in Figure 2. Only half of the charging car is shown in Figures 4 and 5, but the opposite end of the car is identical with the end shown. The container 34 includes at each end an upwardly extending end wall 39 and a removable side wall 40. On the side of the container away from the furnace, there is a movable side wall 41 which is movable across the container to push the material out of the container into the furnace. The movable side wall includes a vertical leg 42 and a horizontal leg 43. In order to reduce friction, each end portion of the wall 41 includes a set of rotatable rolls 45 which are grooved to ride on rails or guides 46 on the upper surface of bottom wall 48 of container 34. A housing 50 extends forwardly from the vertical wall 42 to cover the exposed rolls 45 and to prevent scrap from becoming entangled with these rolls. Other means may be used for mounting the container and the movable side wall 41 for lateral movement.

When the container 34 is moved into the charging position shown in Figure 2, the container extends to the furnace and preferably extends through the doorway into the furnace so that when the movable side wall is moved to the charging position, the material is pushed out of the container and onto the hearth 52. Particularly when a high scrap metal charge is used, the pile of scrap may reach up to, or substantially to, the roof 53 and preferably the container and movable side wall 41 extend through the doorway 12 so that the wall 41 will push this pile of scrap back and prevent the scrap from falling out the door when the charging car is retracted to its normal position. At each end of the car, there are a pair of spaced stops 56 and 57 mounted on the top plate 29. A stop 58 is mounted on the underside of the bottom wall 48 of the container and between stops 58 and 57. The position of stop 58 is shown in dotted lines on Figure 6.

The stops 56, 57 and 58 are so arranged that when the container 34 is in the normal or retracted position shown in Figure 3, the stop 58 is in contact with or closely spaced from stop 57 so that the container cannot be retracted too far and the stop 56 is positioned so that when the container is in the charging position as shown in Figure 2, the stop 58 contacts or is closely adjacent to stop 56 to prevent accidental further movement of the container in a direction toward the furnace.

When the container 34 has been moved into the charging position, the container extends laterally outwardly from the car and overhangs the side of the car. Safety means may be provided to prevent tilting of the container. At each end of the car the end of the container bottom wall 48 extends between a pair of spaced upper and lower bars 60 and 61. A hold down roll 62 is rotatably mounted in a bearing block 63 and the roll 62 is positioned so as to engage the upper surface of the end portion of plate 48 which extends outwardly beyond the end wall 39. Preferably the bars 60 and 61 are spaced so as not to normally engage the end of plate 48 to reduce friction. The bars 60 and 61 do provide a safety means and are an additional protection against tilting of the container if hold down rolls 62 fail for any reason.

The container 34 is adapted to hold a large quantity of scrap and may hold, for example, 20 tons or more of relatively light weight scrap metal. A greater quantity of heavy scrap can be loaded into the container. A relatively large force is required to move the container, the peel 24 of the charging machine being used for moving the container and for discharging the material from the container. On the back of the movable wall 41, there is mounted means for engaging the end of peel 24 and this peel engaging means includes a pair of spaced vertical bars 70 adapted to fit on opposite sides of reduced neck 71 adjacent head 72 on the outer end of peel 24. Spaced from bars 70 is a plate 73 and the enlarged head 72 on the peel fits between plate 73 and bars 70. Thus, the operator on the charging machine can move the raised outer end of the peel to the position shown in broken lines at A in Figure 3 and then can lower the outer end of the peel so that the head 72 fits between plate 73 and bars 70 with the neck 71 located between the bars 70. Thus, the plate 73 and bars 71 constitute means for engaging the end of the peel 24 so that movement of the peel toward and away from the furnace will move the movable wall 41.

When the charging car is being loaded and moved along the tracks in the stock yard and on the charging floor, the car is subjected to shock and vibration and locking means is provided for holding the container and the movable wall 41 in their normal positions. The locking means is readily releasable to permit charging the open-hearth furnace. As shown more fully in Figures 4, 5, 10, and 11, there is mounted on the back of movable walls 41 a pair of swingable arms 76. Each arm 76 is mounted on a pivot pin 77. A locking pin 78 is connected to the outer end of each arm 76 by links 80. When the pins 78 are in the locking position, each pin 78 extends through an aperture 81 in the bottom portion 43 of the movable wall and through an aperture 82 in the bottom wall 48 of the container. The lower end of the pin extends into the aperture 83 located in the plate 29 to lock the movable wall and the container in their normal or retracted position on the car. The opposite or inner end 85 of each arm 76 is positioned adjacent the means for engaging the outer end of the peel and the arm ends 85 extend into the space between the plate 73 and bars 71 so that when the end of the peel is lowered into engagement with the movable wall, the ends 85 of arms 76 are swung downwardly to raise the pins 80 out of engagement with the container 34 and the car frame to the position shown in Figure 10 so that the peel 24 can then move the container 34 to the charging position and then move the wall 41 across the container means as will be more fully hereinafter described.

When the peel is moved outwardly toward the open hearth to charge the open hearth furnace, the container 34 and the movable wall 41 are moved together until the container has been moved to the charging position indicated at B on Figure 3. Then the movable wall 41 is moved across the container to the position indicated in broken lines at C to push the material out of the container and into the open hearth furnace 10. Similar latch means 88 is provided adjacent each end of the container and a cam 89 is mounted on top of the car frame for releasing the respective latch means 88. The latch means 88 is shown more fully in Figures 4, 5, 15 and 16 and the cam 89 is shown in Figures 3, 5 and 18. A generally L-shaped latch member 90 is swingably mounted on a pivot pin 91 which is in turn mounted in a pair of spaced plates 93 carried by the movable wall 41. A notch 94 is cut in the horizontal, rearwardly extending plate 43 of movable wall 41 and there is a similar notch 95 in the bottom wall 48 of the container 34 with the notches 94 and 95 being in vertical alignment. The latch member 90 includes a horizontal leg 97 and a vertical leg 98 terminating in a nose portion 99. With the latch member in the position shown in full lines in Figures 15 and 16, the leg 97 extends horizontally rearwardly from the pivot pin 91 and the inner surface 100 of the vertical leg 98 engages the notched edges of plates 43 and 48. Thus when the peel pushes against the movable wall 41, the vertical leg 98 of latch member 90 which is mounted on the movable wall engages the container so that the container and movable wall are moved simultaneously toward the left as indicated in Figure 3. On the top plate 29 of the car frame 25 there is mounted a cam 89 and as is shown more fully in Figure 18, the cam 89 includes an inclined cam surface 101 and an upper horizontal surface 102. The cam 89 is arranged on the frame so that as the container 34 approaches the position indicated at B on Figure 3, the nose 99 of the latch member engages the cam surface 101 and as the container is moved toward position B the nose of the latch member is raised to the level of the surface 102. Surface 102 is flush with or closely adjacent to the bottom surface of container wall 48. When the latch member is raised by the cam 89, the inner edge 100 of the latch member is positioned so that the edge is inclined and wall 41 can move to the left a short distance to bring the inner edge 100 into engagement with the rear edge of plate 48. With the latch member tilted in this manner, further movement of the movable wall 41 will cause the latch member to kick up to the position shown in broken lines at E on Figure 16, so that the latch member no longer engages the container. Further movement of the peel toward the left moves the movable wall across the container to the position C with the nose 99 of latch member 90 riding on top of 48. With this latch arrangement, the charging machine operator while positioned at his customary position on the charging machine can move the charging machine peel 24 into engagement with the movable wall 41 and then by moving the peel outwardly can push the container to the charging position and then push the movable wall across the container to push the material into the furnace without leaving his position and without having an assistant at the charging car for manually operating controls to cause the movable wall and the container to be operated in the proper sequence.

In order to quickly retract the container from the open-hearth furnace, means are provided for effecting retraction of the container, immediately upon retraction of the peel and before the peel has retracted the movable wall 41 to its normal position at the far side of the container. As shown more clearly in Figures 7, 8, and 9, a split collar or clamp 105 is mounted on the peel at a point spaced from the end of the peel. The collar 105 carries a latch member 106 swingably mounted on pin 107. A second similar latch member is mounted on the opposite side of the peel and operates in the same manner as latch member 106 shown in Figures 8 and 9. As shown more clearly in Figures 5 and 8, a notch 108 is cut in the rear central portion of plate 48. At each side of the notch 108 there is an inwardly projecting portion 109 in position to be engaged by the latch members 106 mounted on opposite sides of the peel. The latch members 106 are spaced from the outer end of the peel so that when the container and movable wall are both in the charging position as shown in Figure 2, the nose 110 of each of the latch members 106 will drop into the notch or opening 108 and engage the inner side of the respective one of the inwardly extending portions 109. When the peel is retracted, the latch members 106 engage the container and pull the container back to its normal or retracted position.

A pair of cam members 112, Figure 17, are mounted on the frame plate 29 and these cam members 112 are positioned to engage the latch members 106 on the peel, without interfering with movement of the container. The latch members are positioned inwardly from the portions 109, Figure 9, and the cam members 112 are positioned inwardly of respective portions 109 while also being positioned so as to engage a latch member 106. As the container is retracted to the normal position shown in Figure 3, the latch member engages the first inclined cam surface 114 on the respective cam member 112 and rides up onto the horizontal surface 115 of the cam member. Upon further rearward movement of the container, the latch member engages the inclined cam surface 117 and is raised up out of engagement with the container to the positions shown in dotted lines in Figure 8. Further retraction of the peel then moves the movable wall back to its normal or retracted position. The cam members 112 are positioned so that the latch members 106 are released from engagement with the container when the container has been retracted to its normal position. The nose of each latch member 106 is formed with an inclined surface 118 so that when the peel is moved forwardly to move the container and movable wall to the charging positions, the latch members upon striking respective cams 112 and upon then striking the rear edge of container wall 48, will be raised so as to pass over the cam members and also portions 109 of the container. Thus, as the movable wall approaches the position C, the latch members are raised to the position shown in broken lines in Figure 8, after which the latch members fall into the position shown in full lines in Figure 8, and into engagement with the container.

A stop 120 is also mounted on each side of the bracket member 105 and this stop is positioned so as to prevent moving the movable wall 41 too far toward the left. The stop 120 is in engagement with or closely spaced from the rear edge of the container plate 48 when the movable wall 41 is in the discharging position or position C and is a safety means preventing accidental movement of the wall out of the container and into the furnace.

After the car 19 has been loaded and moved into position adjacent the furnace 10 which is to be charged and after the charging machine 16 has been moved along the track 15 into alignment with the open-hearth furnace, the operator can quickly charge the contents of the car into the furnace. Before charging the furnace the removable side wall 40 is removed and this may be done by means of the usual mill crane and the door or doors 13 are raised. The operator through actuation of the various controls located on the charging machine raises the outer end of the peel 24 into the position shown in broken lines at A on Figure 3. He then moves the outer end of the peel forwardly and downwardly between the plate 73 and the bars 70 so that the end of the peel engages the peel engaging means on the movable wall. Movement of the outer end of the peel into the position shown in full lines in Figures 3, moves the arms 76 to disengage the pins 78 so that the container can be moved relatively to the car frame. The upper carriage 23 and the peel 24 are then moved outwardly toward the open-hearth furnace to push the container toward the open-hearth furnace and into the charging position indicated by broken lines at B on Figure 3. As the container 34 is moved into the charging position, the latch members 88 are disengaged from the container by the respective cams 89. Further movement of the peel toward the furnace moves the movable wall 41 across the container to position C to push the container contents into the furnace. When the container wall has been moved to position C, the latch members 106 on the peel engage the container so that when the operator moves the carriage 23 back along the rails 21 the peel pulls the container out of the furnace and back to its normal or retracted position. As the container is retracted to its normal position the latch members 106 are disengaged from the container by the cams 112 so that further retraction of the peel moves the movable wall back across the container to its normal position. After both the container and the movable wall have been retracted to their normal positions, the operator raises the end of the peel out of engagement with the movable wall after which the next car can be moved into charging position and its contents charged into the furnace. Before the car is moved from in front of the furnace the removable wall 40 is replaced on the car and preferably the door 13 is lowered into position over the doorway 12 as soon as possible to reduce the heat loss from the furnace and to protect the workmen in the vicinity.

The removable wall 40 may be omitted if desired, although without the wall 40 less material can be charged into the container. While the charging car will be used to the greatest extent for charging scrap metal into the open-hearth furnace, it may be used for charging ore or limestone or other solid material. In addition while the movable wall and the container are mounted on rolls to reduce the friction, it is to be understood that other means may be provided for mounting the container and the movable wall for movement to the charging position. Instead of being mounted on the rolls 31, the container could be mounted on ways and the movable wall 41 could slide across the container instead of being rolled across the container.

We claim:

1. A charging car for charging material into an open-hearth furnace, the charging car comprising frame means, container means mounted on the frame means for holding the material, the container means being supported on the frame means for lateral movement of the container means relative to the frame means and from a normal position to a charging position in which the container means extends laterally outwardly from the car, a sidewall structure in a normal position at one side of the container means, the sidewall structure being movable from the normal position across the container means and into the open-hearth furnace, first releasable locking means engaging the container means and the frame means in the normal position of the container means, a second releasable locking means engaging the container means and the side wall structure in the normal position of the side wall structure, the first releasable locking means being disengageable from the frame means so that the container means is movable to the charging position, and means responsive to movement of the container means to the charging position for releasing the second releasable locking means so that the side wall structure is movable across the container means to push the charge out of the container means.

2. A charging car for charging material into an open-hearth furnace, the charging car comprising frame means, container means mounted on the frame means for holding the material, means supporting the container means on the frame means for lateral movement of the container means relative to the frame means and from a normal position to a charging position in which the container means extends laterally outwardly from the car, a side wall structure in a normal position at one side of the container means, the side wall structure having peel engaging means adapted to engage the end of a charging machine peel and being movable by such a peel from the normal position across the container means to push the charge out of the container means and into the open-hearth furnace, first releasable locking means engaging the container means and the frame means releasably holding the container means in its normal position, second releasable locking means engaging the container means and the side wall structure releasably holding the side wall structure in the normal position, means responsive to the peel in the peel engaging means for releasing the first releasable locking means so that the container means is movable to the charging position, and means responsive to movement of the container means to the charging position for releasing the second releasable locking means so that the side wall structure is movable across the container means to push the charge out of the container means.

3. A charging car for charging material into an open-hearth furnace, the charging car comprising frame means, container means mounted on the frame means for holding the material, means supporting the container means on the frame means for lateral movement of the container means relative to the frame means and from a normal position to a charging position in which the container means extends laterally outwardly from the car, a side wall structure in a normal position at one side of the container means, the side wall structure having peel engaging means adapted to engage the end of a charging machine peel and being movable by such a peel from the normal position across the container means to push the charge out of the container means and into the open-hearth furnace, and releasable locking means mounted on the side wall structure and engaging the container means and the frame means and releasably holding both the container means and the side wall structure in the normal position, said releasable locking means being disengageable from the container means and the frame means so that the container means is movable to the charging position and so that the side wall structure is movable across the container means to push the charge out of the container means, and said releasable locking means being positioned adjacent the peel engaging means in position to be engaged by the peel when in engagement with the peel engaging means and being movable out of engagement with the container means and the frame means by the peel upon movement of the peel into engagement with the peel engaging means, the releasable locking means includes arm means movable to release the locking means, the arm means being positioned adjacent the peel engaging means in position to be engaged and moved by the peel upon movement of the peel into engagement with the peel engaging means so that the peel moves the arm to release the locking means.

4. A charging car for charging material into an open-hearth furnace, the charging car comprising frame means, container means mounted on the frame means for holding the material, means supporting the container means on the frame means for lateral movement of the container means relative to the frame means and from a normal position to a charging position in which the container means extends laterally outwardly from the car, a side wall structure in a normal position at one side of the container means, the side wall structure having peel engaging means adapted to engage the end of a charging machine peel and being movable by such a peel from the normal position across the container means to push the charge out of the container means and into the open-hearth furnace, and releasable locking means mounted on the side wall structure and engaging the container means and the frame means and releasably holding both the container means and the side wall structure in the normal position, said releasable locking means being disengageable from the container means and the frame means so that the container means is movable to the charging position and so that the side wall structure is movable across the container means to push the charge out of the container means, and said releasable locking means being positioned adjacent the peel engaging means in position to be engaged by the peel when in engagement with the peel engaging means and being movable out of engagement with the container means and the frame means by the peel upon movement of the peel into engagement with the peel engaging means, the releasable locking means including pin means engaging portions of the container means and the frame means and the side wall structure, the pin means being movable out of engagement with the portions of the container means and the frame means, the releasable locking means including arm means connected to one end of the pin means, the arm means having the opposite end positioned adjacent the peel engaging means in position to be engaged by the peel when moved into engagement with the peel engaging means whereby movement of the peel into engagement with the peel engaging means moves the arm means to release the pin means from engagement with the container means and the frame means.

5. A charging car for charging material into an open-hearth furnace, the charging car comprising frame means, container means mounted on the frame means for holding the material, means supporting the container means on the frame means for lateral movement of the container means relative to the frame means and from a normal position to a charging position in which the container means extends laterally outwardly from the car, a side wall structure in a normal position at one side of the container means, the side wall structure having peel engaging means adapted to engage the end of a charging machine peel and being movable by such a peel from the normal position across the container means to push the charge out of the container means and into the open-hearth furnace, and latch means mounted on the side wall structure engaging the container means and holding the side wall structure in the normal position relative to the container means so that when the peel pushes against the side wall structure both the side wall structure and the container means are moved together to move the container means to the charging position, means responsive to movement of the container means to the charging position for releasing the latch means so that the side wall structure is movable across the container means to push the material out of the container means after the container means has been moved to the charging position.

6. A charging car for charging material into an open-hearth furnace, the charging car comprising frame means, container means mounted on the frame means for holding the material, means supporting the container means on the frame means for lateral movement of the container means relative to the frame means and from a normal position to a charging position in which the container means extends laterally outwardly from the car, a side wall structure in a normal position at one side of the container means, the side wall structure having peel engaging means adapted to engage the end of a charging machine peel and being movable by such a peel from the normal position across the container means to push the charge out of the container means and into the open-hearth furnace, and latch means mounted on the side wall structure engaging the container means and holding the side wall structure in the normal position relative to the container means so that when the peel pushes against the side wall structure both the side wall structure and the container means are moved together to move the container means to the charging position, and cam means mounted on the frame means in position to engage and release the latch means upon movement of the container means to the charging position so that the side wall structure is movable across the container means to push the material out of the container means after the container means has been moved to the charging position.

7. In an open-hearth plant comprising an open-hearth furnace having a charging doorway and a charging machine including a peel movable toward the open-hearth furnace and retractable away from the open-hearth furnace, a charging car spaced from the open-hearth furnace between the open-hearth furnace and the charging machine, the charging car including frame means, container means mounted on the frame means for holding the material to be charged through the doorway into the open-hearth furnace, means supporting the container means on the frame means for lateral movement from a normal retracted position toward the open-hearth furnace to a charging position in which the container means extends laterally outwardly from the car to the door-way, a side wall structure on the side of the container means away from the open-hearth furnace, peel engaging means on the side wall structure adapted to engage the end of the charging machine peel, the side wall structure being movable from the retracted position across the container means toward the open-hearth furnace to push the charge out of the container means into the furnace, and latch means mounted on the side wall structure and engaging the container means to hold the side wall structure in the retracted position on the container means so that when the peel engages the peel engaging means and pushes on the side wall structure both the side wall structure and the container means are moved simultaneously toward the open hearth furnace to move the container means to the charging position, said latching means being releasable to permit the peel to move the side wall structure across the container means to push the charge through the door and into the furnace.

8. The open-hearth plant claimed in claim 7 in which the charging car includes cam means mounted on the frame means in position to engage and release the latch means upon movement of the container means to the charging position.

9. The open-hearth plant claimed in claim 7 in which the charging car includes releasable locking means mounted on the side wall structure, the releasable locking means including a pin engaging the container means and the frame means to hold the side wall structure and the container means in the retracted position on the frame means and including an arm means positioned to be engaged and moved by the peel upon movement of the peel into engagement with the peel engaging means whereby movement of the peel into engagement with the peel engaging means moves the arm means and the pin to release the side wall structure and the container means.

10. In an open-hearth plant comprising an open-hearth furnace having a charging doorway, a charging machine including a peel movable toward the open-hearth furnace and retractable away from the open-hearth furnace, a charging car spaced from the open-hearth furnace and positioned between the open-hearth furnace and the charging machine, the charging car including frame means, container means mounted on the frame means for holding the material, means supporting the container means on the frame means for movement by the peel from a retracted position toward the open-hearth furnace to a charging position, a side wall structure on the side of the container means away from the open-hearth furnace, the side wall structure being movable across the container means to push the charge out of the container means and through the doorway into the open-hearth furnace, and stop means positioned on the peel in position to engage the container means when both the container means and the side wall structure are in the charging positions to prevent further movement of the side wall structure relative to the container means in a direction toward the open-hearth furnace.

11. In an open-hearth plant comprising an open-hearth furnace having a charging doorway, a charging machine including a peel movable toward the open-hearth furnace and retractable away from the open-hearth furnace, a charging car between the open-hearth furnace and the charging machine, a charging car including frame means, container means mounted on the frame means for holding the material to be charged through the doorway into the open-hearth furnace, means supporting the container means on the frame means for movement by the peel from a retracted position toward the open-hearth furnace to a charging position, a side wall structure on the side of the container means away from the open-hearth furnace, the side wall structure being movable by the peel across the container means to a charging position to push the charge out of the container means and into the furnace, and latch means positioned on the peel to engage the container means when the side wall structure and container means are both in the charging position so that when the peel is retracted the side wall structure and the container means are simultaneously moved away from the furnace.

12. The open-hearth plant claimed in claim 11 in which said latch means is releasable to permit the peel to move the side wall structure relative to the container means after the container means has been moved to the retracted position so that when the peel is retracted the container means is first moved to the retracted position and then the side wall structure is moved into position at said one side of said container means.

13. The open-hearth plant claimed in claim 12 in which the charging car includes cam means mounted on the frame means in position to engage and release the peel latch means upon return of the container means to a retracted position so that further retraction of the peel moves the side wall structure across the container means and back into position at said one side of the container means.

References Cited in the file of this patent

UNITED STATES PATENTS

| 421,797 | Wellman | Feb. 18, 1890 |

FOREIGN PATENTS

| 113,027 | Germany | Aug. 30, 1900 |
| 606,445 | Great Britain | Aug. 13, 1948 |